United States Patent
Rao et al.

(10) Patent No.: US 10,620,448 B2
(45) Date of Patent: Apr. 14, 2020

(54) SPECKLE-FREE IMAGING LIGHT SOURCE BASED ON RANDOM FIBER LASER USING STRONG-COUPLING MULTI-CORE OPTICAL FIBER

(71) Applicant: University of Electronic Science and Technology of China, Chengdu, Sichuan (CN)

(72) Inventors: Yunjiang Rao, Sichuan (CN); Rui Ma, Sichuan (CN); Weili Zhang, Sichuan (CN); Bo Hu, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 0 days.

(21) Appl. No.: 16/035,722

(22) Filed: Jul. 16, 2018

(65) Prior Publication Data
US 2018/0341120 A1 Nov. 29, 2018

(30) Foreign Application Priority Data
Jan. 30, 2018 (CN) .......................... 2018 1 0088674

(51) Int. Cl.
*H01S 3/067* (2006.01)
*G02B 27/48* (2006.01)
*H01S 3/30* (2006.01)
*H01S 3/131* (2006.01)
*H01S 3/08* (2006.01)
(Continued)

(52) U.S. Cl.
CPC .......... *G02B 27/48* (2013.01); *H01S 3/06737* (2013.01); *H01S 3/0804* (2013.01); *H01S 3/1312* (2013.01); *H01S 3/302* (2013.01); *H01S 3/0675* (2013.01); *H01S 3/06791* (2013.01); *H01S 3/1053* (2013.01); *H01S 3/1055* (2013.01)

(58) Field of Classification Search
CPC .......... H01S 3/06737; H01S 3/094042; H01S 3/094053; H01S 3/0675
See application file for complete search history.

(56) References Cited

U.S. PATENT DOCUMENTS

| 5,566,196 A * | 10/1996 | Scifres | G02B 6/02042 |
| | | | 372/6 |
| 7,903,696 B2 * | 3/2011 | Klebanov | H01S 3/0675 |
| | | | 359/333 |
| 2002/0159488 A1 * | 10/2002 | Wolak | G02B 6/262 |
| | | | 372/36 |

OTHER PUBLICATIONS

Ma, R. et al. "Quasi mode-locking of coherent feedback random fiber laser," Dec. 2016, Sci. Rep. 6, pp. 1-8. (Year: 2016).*

* cited by examiner

Primary Examiner — Michael Carter
(74) Attorney, Agent, or Firm — Lei Yu

(57) ABSTRACT

A speckle-free imaging light source based on a random fiber laser (RFL) using a strong-coupling multi-core optical fiber, relating to a field of optical fiber laser illumination light source, is provided, mainly including a pumping source and an optical fiber loop mirror, and further including the strong-coupling multi-core optical fiber with/without a single-mode optical fiber. Through directly adopting the strong-coupling multi-core optical fiber or combining the single-mode optical fiber with the strong-coupling multi-core optical fiber to serve as a main device in the RFL-based illumination light source, the generated RFL has multiple transvers modes and low spatial coherence which prevent speckle formation (Continued)

during illumination, which provides an ideal illumination light source for high-speed full-field speckle-free imaging technology.

3 Claims, 2 Drawing Sheets

(51) Int. Cl.
  *H01S 3/1055* (2006.01)
  *H01S 3/105* (2006.01)

US 10,620,448 B2

SPECKLE-FREE IMAGING LIGHT SOURCE BASED ON RANDOM FIBER LASER USING STRONG-COUPLING MULTI-CORE OPTICAL FIBER

CROSS REFERENCE OF RELATED APPLICATION

The application claims priority under 35 U.S.C. 119(a-d) to CN 201810088674. X, filed Jan. 30, 2018.

BACKGROUND OF THE PRESENT INVENTION

Field of Invention

The present invention relates to a field of optical fiber laser illumination light source, and more particularly to a speckle-free imaging light source based on a random fiber laser using a strong-coupling multi-core optical fiber.

Description of Related Arts

The illumination light source for imaging is the research focus in the imaging field. The ideal illumination imaging light source is required to have the advantages of low coherence, high spectral intensity and high brightness output. However, traditional illumination light sources have many limiting factors. For example, the light emitting diode (LED) has the relatively low spectral intensity and brightness, which will limit the imaging speed and efficiency; the laser diode (LD) has the relatively high coherence, which will cause the speckle effect brought by the own interference of the light source and decrease the imaging quality; the wavelength of the amplified spontaneous emission (ASE) light source is limited by the energy level of rare-earth ions and has poor tenability.

The traditional random laser light source has the advantages of low spatial coherence and high spectral intensity, which is able to realize the speckle-free imaging illumination. However, the traditional random laser light source has the disadvantages of non-directional emission at any angle and low output power, and is unable to be applied in the high efficient illumination system. The random fiber laser (RFL) as an important light source can be applied in fields of non-linear optics, optical communication, imaging and sensing; the output of the RFL has the advantages of relatively good directivity, high brightness and low temporal coherence; and the RFL has the potential application value in the high-speed full-field speckle-free imaging field. However, output of the traditional RFL based on the single-mode optical fiber is single-transverse-mode output, so that the traditional single-mode RFL still has relatively high spatial coherence which is bad for the speckle-free imaging illumination.

SUMMARY OF THE PRESENT INVENTION

An object of the present invention is to provide a speckle-free imaging light source based on a random fiber laser (RFL) using a strong-coupling multi-core optical fiber, which directly adopts the strong-coupling multi-core optical fiber or combines a single-mode optical fiber with the strong-coupling multi-core optical fiber to serve as a main device in the RFL-based illumination light source. Therefore, the generated RFL has multi transverse modes and low spatial coherence that prevent speckle formation during illumination. As generated through a lasing process, the RFL naturally has high spectral density and high output power, which are important for a high-speed full-field illumination light source.

Following technical solutions are adopted by the present invention.

A speckle-free imaging light source based on a RFL using a strong-coupling multi-core optical fiber mainly comprises a pumping source and an optical fiber loop mirror, and further comprises the strong-coupling multi-core optical fiber connected with the pumping source and the optical fiber loop mirror.

According to the present invention, an input end of the strong-coupling multi-core optical fiber is connected with the pumping source and the optical fiber loop mirror. The optical fiber loop mirror provides point feedback, while the strong-coupling multi-core optical fiber provides both stimulated Raman scattering for amplification and distributed Rayleigh scattering for random distributed feedback to generate random lasing. Through adopting the strong-coupling multi-core optical fiber to form a random lasing device, the generated RFL has multi transvers modes and low spatial coherence which prevent speckle formation during illumination.

Preferably, the speckle-free imaging light source further comprises a single-mode optical fiber respectively connected with the pumping source, the optical fiber loop mirror and the strong-coupling multi-core optical fiber. An input end of the single-mode optical fiber is connected with the pumping source and the optical fiber loop minor which provides point feedback; an output end of the single-mode optical fiber is connected with the strong-coupling multi-core optical fiber, amplification and distributed feedback for the random lasing process are provided by both the two optical fibers through stimulated Raman scattering and distributed Rayleigh scattering. Through combining the single-mode optical fiber with the strong-coupling multi-core optical fiber, the threshold of the lasing device is decreased.

Preferably, the strong-coupling multi-core optical fiber comprises a main optical fiber core, multiple secondary optical fiber cores and a cladding. The refractive index of the main optical fiber core and the secondary optical fiber cores is larger than that of the cladding. Strong coupling effects exist between the main optical fiber core and the secondary optical fiber cores, and among the secondary optical fiber cores. In this way, more transverse modes can be supported using the multi-core optical fiber comparing with a single main core optical fiber. Furthermore, the effective refractive index of the high-order transverse modes can be increased, which means high-order transverse modes can be effectively stimulated in the multi-core optical fiber comparing with a single main core optical fiber. Therefore, the multi-transverse-mode RFL can be realized with low spatial coherence.

Preferably, a long-period optical fiber grating is written in the strong-coupling multi-core optical fiber, for further converting low-order modes of the main optical fiber core into high-order modes and stimulating enough transverse modes. Through imposing a tensile force on the long-period optical fiber grating and bending the long-period optical fiber grating, the spatial coherence of the multi-mode RFL is adjusted and controlled, so that the RFL with low spatial coherence is realized.

Preferably, the single-mode optical fiber is one of a communication standard single-mode optical fiber, a dispersion compensating fiber, a dispersion-shifted fiber and a highly-nonlinear fiber. Therefore, a lasing bandwidth of the RFL is flexibly tunable with proper choosing of optical fiber.

In conclusion, through adopting the above technical solutions, the present invention has following beneficial effects.

Firstly, according to the present invention, the strong-coupling multi-core optical fiber comprises the main optical fiber core, the multiple secondary optical fiber cores and the cladding. The refractive index of the main optical fiber core and the secondary optical fiber cores is larger than that of the cladding. Strong coupling effects exist between the main optical fiber core and the secondary optical fiber cores, and among the secondary optical fiber cores. In this way, more transvers modes can be supported in the multi-core optical fiber. The high-order transverse modes can be effectively stimulated and the multi-transverse-mode RFL can be realized with low spatial coherence for speckle-free imaging.

Secondly, according to the present invention, the structure is formed by the combination of the single-mode optical fiber and the strong-coupling multi-core optical fiber, effectively reducing the lasing threshold for low coherent random lasing and increasing the efficiency for speckle-free imaging.

Thirdly, according to the present invention, the long-period optical fiber grating is written in the strong-coupling multi-core optical fiber, for further converting the low-order modes of the main optical fiber core into the high-order modes and stimulating enough transverse modes. Through imposing the tensile force on the long-period optical fiber grating and bending the long-period optical fiber grating, the spatial coherence of the multi-mode RFL is adjusted and controlled, so that the RFL with low spatial coherence is realized.

Fourthly, according to the present invention, through choosing the type of the single-mode optical fiber, the lasing bandwidth of the RFL is flexibly tunable, satisfying to the requirement for specified speckle-free imaging.

Fifthly, according to the present invention, through selecting the wavelength of the pumping source, the lasing wavelength of the RFL is flexible adjustable, satisfying the requirement for specified speckle-free imaging and eliminating the noise background from the ambient light.

Sixthly, according to the present invention, through controlling the separation between the main optical fiber core and the secondary optical fiber cores, the number of the secondary optical fiber cores and their distribution, the length and the core diameter of the strong-coupling multi-core optical fiber, the intermodal dispersion can be modulated. In this way, the spatial coherence of the RFL is adjustable and low enough spatial coherence is obtained.

DETAILED DESCRIPTION OF THE PREFERRED EMBODIMENT

In order to make objects, technical solutions and advantages of the present invention more clear and understandable, the present invention is further described in detail with the accompanying drawings and the preferred embodiment. It should be understood that the described preferred embodiment is merely for explaining the present invention, not for limiting the present invention.

Figure 1:
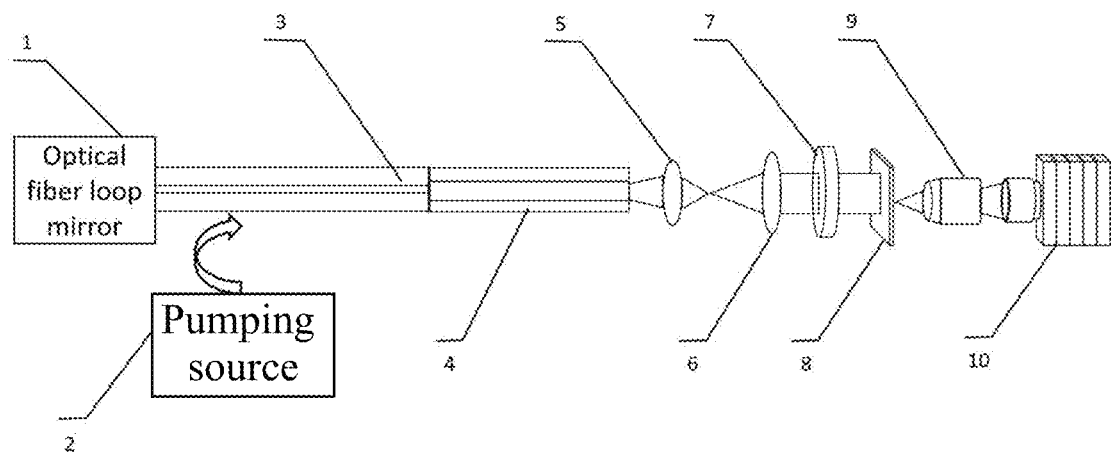
FIG. 1 is a schematic diagram of a speckle-free imaging illumination light source and an imaging test device thereof according to a preferred embodiment of the present invention.

A speckle-free imaging illumination light source and an imaging test device thereof are showed in FIG. 1. The speckle-free imaging illumination light source mainly comprises an optical fiber loop mirror 1, a pumping source 2, a single-mode optical fiber 3, and a strong-coupling multi-core optical fiber 4. Alternatively, the combination of the single-mode optical fiber 3 and the strong-coupling multi-core optical fiber 4 is replaced by the strong-coupling multi-core optical fiber 4.

An input end of the single-mode optical fiber 3 is connected with the optical fiber loop mirror 1. Point feedback is provided by the optical fiber loop mirror 1. The pumping source 2 is injected into the sing-mode optical fiber 3 using a wavelength division multiplexer. A specific wavelength of random fiber laser (RFL) can be generated through adjusting a wavelength of the pumping source 2, so that the RFL has a flexible and adjustable lasing wavelength, thereby satisfying a requirement for specified speckle-free imaging and eliminating a noise background from an ambient light.

An output end of the single-mode optical fiber 3 is connected with the strong-coupling multi-core optical fiber 4. Amplification and distributed feedback for a random lasing process are provided by both the two optical fibers through stimulated Raman scattering and distributed Rayleigh scattering.

The single-mode optical fiber 3 can be one of a communication standard single-mode optical fiber, a dispersion compensating fiber, a dispersion-shifted fiber and a highly-nonlinear fiber. Through combining with the specified single-mode optical fiber 3, a bandwidth characteristic of the random lasing process can be adjusted and controlled.

Figure 2:
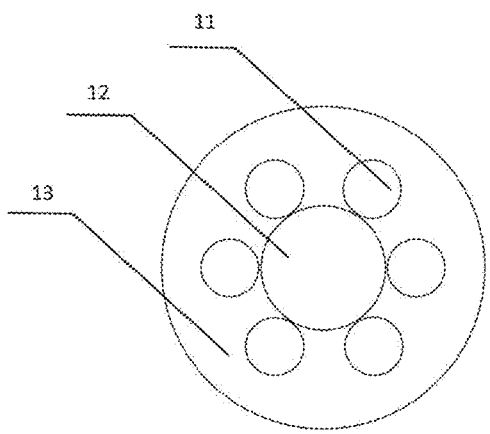
FIG. 2 is a structural diagram of a strong-coupling multi-core optical fiber according to the present invention.

As shown in FIG. 2, the strong-coupling multi-core optical fiber 4 comprises multiple secondary optical fiber cores 11, a main optical fiber core 12 and a cladding 13. The main optical fiber core 12 is a multi-mode optical fiber core with a large core diameter; the multiple secondary optical fiber cores 11 are uniformly distributed around the main optical fiber core 12; the secondary optical fiber cores 11 cling to the main optical fiber core 12, so as to stimulate strong coupling between the main optical fiber core 12 and the secondary optical fiber cores 11. Strong coupling also exists among the secondary optical fiber cores 11, for effectively stimulating more transverse high-order modes and realizing a multi-transverse-mode RFL with low spatial coherence.

The strong-coupling multi-core optical fiber 4 can be applied in generating the multi-transverse-mode RFL. The strong-coupling multi-core optical fiber can be replaced by a multi-mode optical fiber. The multi-mode optical fiber can be one of a step index multi-mode optical fiber with a large core diameter, a graded index multi-mode optical fiber with a large core diameter, and a hollow-core optical fiber with a large core diameter. However, with adopting the strong-coupling multi-core optical fiber 4, the required optical fiber length is shorter, that is to say the strong-coupling multi-core optical fiber is more beneficial to obtaining the low spatial coherence.

A long-period optical fiber grating is written in the strong-coupling multi-core optical fiber 4 or the multi-mode optical fiber. Through imposing a tensile force on the long-period optical fiber grating and bending the long-period optical fiber grating, the spatial coherence of the multi-mode RFL is adjusted and controlled, so as to further optimize the spatial coherence of the multi-mode RFL.

Figure 3:
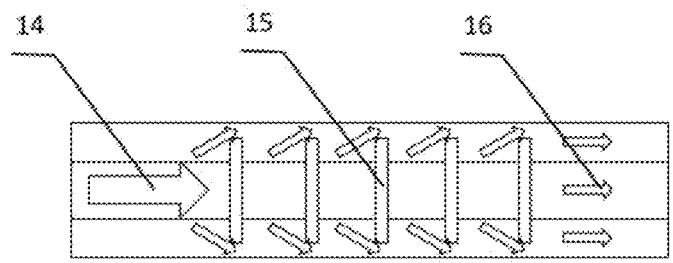
FIG. 3 is a schematic diagram of spatial coherence modulation of a long-period optical fiber grating written in the strong-coupling multi-core optical fiber according to the present invention.

A schematic diagram of spatial coherence modulation of the long-period optical fiber grating written in the strong-coupling multi-core optical fiber is showed in FIG. 3. An input light 14, a grating 15 written in the strong-coupling multi-core optical fiber or the multi-mode optical fiber, and an output light 16 are showed in FIG. 3. The grating 15 written in the strong-coupling multi-core optical fiber or the multi-mode optical fiber is to further convert lower-order transverse modes into higher-order transverse modes and stimulate enough transverse modes. The spatial coherence of the RFL can be adjusted and controlled, so as to realize the low spatial coherence for speckle-free imaging.

Preferred Embodiment

A speckle-free imaging illumination light source and an imaging test device thereof are showed in FIG. 1. The speckle-free imaging illumination light source comprises an optical fiber loop mirror 1, a pumping source 2, a single-mode optical fiber 3, and a step index multi-mode optical fiber 4 with a large core diameter. The imaging test device comprises a first lens 5 (with a focal length of a mm), a second lens 6 (with a focal length of b mm), a ground glass 7, a US Air Force resolution chart 8 (USAF 1951), a microscope objective 9 and a camera 10 (CCD), wherein: the first lens 5 (with the focal length of a mm) and the second lens 6 (with the focal length of b mm) form a classic Kohler illumination system; the ground glass 7 is for adding a random phase modulation to the illumination light source; the US Air Force resolution chart 8 (USAF 1951) is used as an imaging object after the illumination light is modulated, so as to assess an imaging quality; the microscope objective 9 and the camera 10 (CCD) are used for imaging of the US Air Force resolution chart 8 (USAF 1951).

A central wavelength of the RFL generated by the pumping source 2 is 1555 nm and a bandwidth is 1 nm.

The core diameter of the step index multi-mode cal fiber 4 is 105 μm, while a numerical aperture is 0.24 and a length is 50 m.

Figure 4:
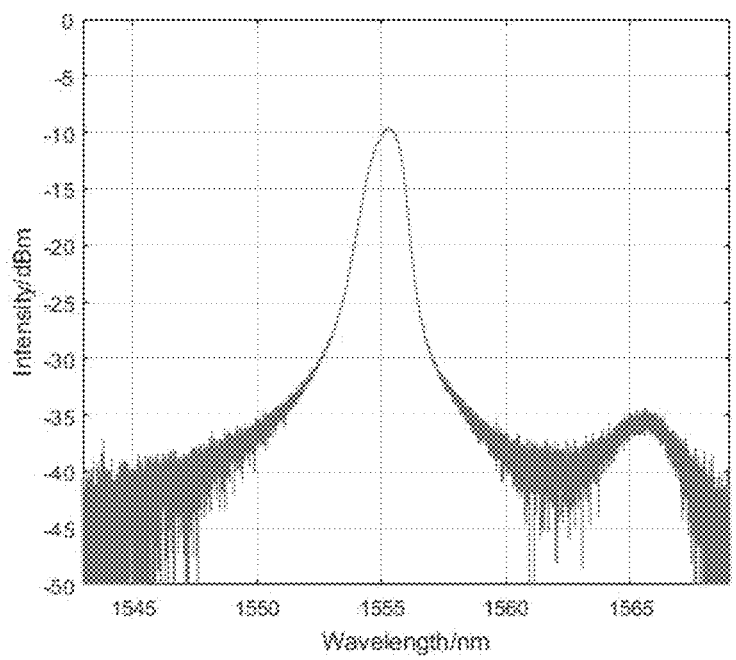
FIG. 4 is an optical spectrum of a random fiber laser (RFL) according to the preferred embodiment of the present invention.

FIG. 4 shows an optical spectrum of the RFL according to the preferred embodiment of the present invention. The central wavelength of the RFL is 1550 nm, while a spectral density of the RFL is much higher than that of amplified spontaneous emission sources (ASEs).

Figure 5:
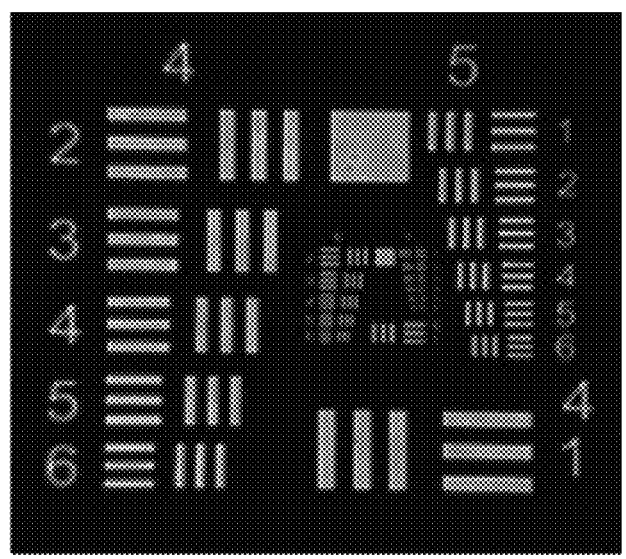
FIG. 5 shows imaging results of speckle-free imaging using multi-transverse-mode illumination according to the preferred embodiment of the present invention.

FIG. 5 shows an imaging result of the speckle-free imaging according to preferred embodiment of the present invention, showing the USAF resolution chart 8 is illuminated by the RFL through the ground glass 7. In FIG. 5, the USAF resolution chart 8 has clear stripes and no speckles.

The above-mentioned is merely a preferred embodiment of the present invention, not for limiting the present invention. Modifications, equivalents and improvements made within the spirit and principles of the present invention are all included in the protection scope of the present invention.

What is claimed is:

1. A speckle-free imaging light source based on a random fiber laser using a strong-coupling multi-core optical fiber, mainly comprising a pumping source and an optical fiber loop mirror, and further comprising a strong-coupling multi-core optical fiber connected with the pumping source and the optical fiber loop mirror, wherein: a long-period optical fiber grating is written in the strong-coupling multi-core optical fiber; the strong-coupling multi-core optical fiber comprises a main optical fiber core, multiple secondary optical fiber cores and a cladding; the main optical fiber core is a multi-mode optical fiber core with a large core diameter; the multiple secondary optical fiber cores are uniformly distributed around the main optical fiber core; the secondary optical fiber cores cling to the main optical fiber core, so as to stimulate strong coupling between the main optical fiber core and the secondary optical fiber cores; and strong coupling also exists among the secondary optical fiber cores.

2. The speckle-free imaging light source based on the random fiber laser using the strong-coupling multi-core optical fiber, as recited in claim 1, further comprising a single-mode optical fiber respectively connected with the pumping source, the optical fiber loop mirror, and the strong-coupling multi-core optical fiber.

3. The speckle-free imaging light source based on the random fiber laser using the strong-coupling multi-core optical fiber, as recited in claim 2, wherein the single-mode optical fiber is one of a dispersion compensating optical fiber, a dispersion-shifted fiber and a highly-nonlinear fiber.

* * * * *